(12) United States Patent
Mages

(10) Patent No.: US 10,000,183 B2
(45) Date of Patent: Jun. 19, 2018

(54) BELT RETRACTOR AND METHOD FOR TIGHTENING AN UNUSED VEHICLE BELT

(71) Applicant: TRW Automotive GmbH, Alfdorf (DE)

(72) Inventor: Mark Mages, Alfdorf (DE)

(73) Assignee: TRW Automotive GmbH (DE)

( * ) Notice: Subject to any disclaimer, the term of this patent is extended or adjusted under 35 U.S.C. 154(b) by 0 days. days.

(21) Appl. No.: 14/890,484

(22) PCT Filed: May 12, 2014

(86) PCT No.: PCT/EP2014/001272
§ 371 (c)(1),
(2) Date: Nov. 11, 2015

(87) PCT Pub. No.: WO2014/183859
PCT Pub. Date: Nov. 20, 2014

(65) Prior Publication Data
US 2016/0082920 A1  Mar. 24, 2016

(30) Foreign Application Priority Data

May 15, 2013 (DE) ........................ 10 2013 008 277

(51) Int. Cl.
*B60R 22/34* (2006.01)
*B60R 22/48* (2006.01)
(Continued)

(52) U.S. Cl.
CPC .............. *B60R 22/34* (2013.01); *B60R 22/46* (2013.01); *B60R 22/48* (2013.01);
(Continued)

(58) Field of Classification Search
CPC . B60R 22/34; B60R 22/48; B60R 2022/4473; B60R 2022/4666;
(Continued)

(56) References Cited

U.S. PATENT DOCUMENTS 3,864,668 A * 2/1975 Bickford ................. B60R 22/48
                                                         180/268
4,382,563 A * 5/1983 Morita ..................... B60R 22/44
                                                         180/268
(Continued)

FOREIGN PATENT DOCUMENTS

DE   4314176 A1 * 11/1994   ............. B60R 22/44
EP   1555173        1/2005
(Continued)

OTHER PUBLICATIONS

JPO machine translation of JP 2010-163042 (original JP ocument published Jul. 29, 2010).*
(Continued)

*Primary Examiner* — Behrang Badii
*Assistant Examiner* — David A Testardi
(74) *Attorney, Agent, or Firm* — Tarolli, Sundheim, Covell & Tummino LLP

(57) ABSTRACT

In a belt retractor (10) for a seat belt comprising a belt reel (12) onto which webbing (14) can be wound while being spring-loaded and comprising a tensioning device (16) which is adapted to act on the belt reel (12) in a winding direction (A), a control (18) is provided which is adapted to activate the tensioning device (16) when the seat belt is unloaded and not fastened.

15 Claims, 1 Drawing Sheet

(51) Int. Cl.
*B60R 22/46* (2006.01)
*B60R 22/02* (2006.01)
*B60R 22/44* (2006.01)

(52) U.S. Cl.
CPC ... *B60R 2022/029* (2013.01); *B60R 2022/444* (2013.01); *B60R 2022/4466* (2013.01); *B60R 2022/4473* (2013.01); *B60R 2022/469* (2013.01); *B60R 2022/4666* (2013.01); *B60R 2022/4685* (2013.01); *B60R 2022/4695* (2013.01)

(58) Field of Classification Search
CPC ...... B60R 2022/4685; B60R 2022/469; B60R 2022/4695; B60R 2022/029; B60R 2022/444; B60R 2022/4446; B60R 2022/4466; B60R 22/44
See application file for complete search history.

(56) References Cited

U.S. PATENT DOCUMENTS

| | | | | | |
|---|---|---|---|---|---|
| 4,478,433 | A | * | 10/1984 | Taguchi | B60R 22/44 180/268 |
| 4,669,680 | A | * | 6/1987 | Nishimura | B60R 22/44 180/268 |
| 4,726,537 | A | * | 2/1988 | Escaravage | B60R 22/44 242/375.3 |
| 4,763,853 | A | * | 8/1988 | Andersson | B60R 22/41 242/383.1 |
| 4,787,569 | A | * | 11/1988 | Kanada | B60R 22/44 242/371 |
| 5,655,619 | A | * | 8/1997 | Suran | B60R 22/343 180/270 |
| 6,485,057 | B1 | * | 11/2002 | Midorikawa | B60R 21/01 280/801.1 |
| 2001/0004030 | A1 | * | 6/2001 | Yano | B60R 22/44 180/268 |
| 2003/0098194 | A1 | * | 5/2003 | Roddy | B60R 22/48 180/270 |
| 2005/0154517 | A1 | * | 7/2005 | Tanaka | B60R 22/44 701/45 |
| 2006/0006269 | A1 | * | 1/2006 | Wier | B60R 22/44 242/374 |
| 2006/0261589 | A1 | * | 11/2006 | Tanaka | B60R 22/02 280/806 |
| 2006/0290131 | A1 | * | 12/2006 | Tanaka | B60R 22/02 280/807 |
| 2007/0114775 | A1 | * | 5/2007 | Inuzuka | B60R 22/34 280/807 |
| 2007/0144811 | A1 | * | 6/2007 | Tanaka | B60R 22/44 180/268 |
| 2007/0199758 | A1 | * | 8/2007 | Saito | B60R 22/46 180/268 |
| 2008/0174098 | A1 | | 7/2008 | Takao et al. | |
| 2008/0238076 | A1 | * | 10/2008 | Takao | B60R 22/02 280/807 |
| 2008/0265551 | A1 | * | 10/2008 | Odate | B60R 22/44 280/733 |
| 2009/0079178 | A1 | * | 3/2009 | Odate | B60R 22/02 280/807 |
| 2009/0243367 | A1 | * | 10/2009 | Tanaka | B60R 22/48 297/475 |
| 2010/0185365 | A1 | * | 7/2010 | Blaas | B60R 22/44 701/45 |

FOREIGN PATENT DOCUMENTS

| | | | |
|---|---|---|---|
| GB | 1448416 | * | 9/1976 |
| JP | 57099437 A | * | 6/1982 |
| JP | 58101855 A | * | 6/1983 |
| JP | 2006082583 A | * | 3/2006 |
| JP | 2006168469 A | * | 6/2006 |
| JP | 2007008217 A | * | 1/2007 |
| JP | 2008110691 A | * | 5/2008 |
| JP | 2009190725 A | * | 8/2009 |
| JP | 2010163042 A | * | 7/2010 |
| JP | 2011031664 | | 2/2011 |
| JP | 2011031664 A | * | 2/2011 |
| JP | 2011183844 A | * | 9/2011 |
| JP | 2012030753 A | * | 2/2012 |

OTHER PUBLICATIONS

JPO machine translation of JP 2011-031664 (original JP document published Feb. 17, 2011).*

JPO machine translation of JP 2006-168469 (original JP document published Jun. 29, 2006).*

* cited by examiner

BELT RETRACTOR AND METHOD FOR TIGHTENING AN UNUSED VEHICLE BELT

RELATED APPLICATIONS

This application corresponds to PCT/EP2014/001272, filed May 12, 2014, which claims the benefit of German Application No. 10 2013 008 277.3, filed May 15, 2013, the subject matter of which are incorporated herein by reference in their entirety.

BACKGROUND OF THE INVENTION

The invention relates to a belt retractor for a seat belt comprising a belt reel onto which webbing can be wound while being spring-loaded and comprising a tensioning device adapted to act on the belt reel in a winding direction. The invention moreover relates to a method of tensioning a non-used vehicle seat belt.

Belt refractors in vehicles wind up the not required webbing on a belt reel by spring actuation. On the one hand, this ensures that the non-used seat belt is safely stored. On the other hand, it is guaranteed that the fastened seat belt always contacts the vehicle occupant so that, when the seat belt locks, the vehicle occupant can be quickly decelerated.

Depending on the seating position and the body dimensions of the vehicle occupant, even in the fastened state of the seat belt part of the webbing is wound on the belt reel of the belt retractor. If in a case of restraint the belt reel is locked, it cannot continue turning for unwinding the webbing. However, since the webbing is loosely wound on the belt reel by repeated winding and unwinding, the windings of the webbing wound onto the belt reel may tighten more closely on the belt reel, thus causing small webbing length to be extended despite effectuated locking of the belt reel. This effect is referred to as film reel effect. However, this additional webbing extension influences the restraining effect of the seat belt, as the vehicle occupant is belatedly involved in the overall deceleration of the vehicle. Although tighter winding of the webbing on the belt reel could be obtained by a stronger winding spring, the webbing extension would be impeded due to the constantly acting spring force, however, and the webbing would be in uncomfortably tight contact with the vehicle occupant.

SUMMARY OF THE INVENTION

It is the object of the invention to provide a belt retractor exhibiting a lower film reel effect and thus allowing for an improved action of the seat belt. It is another object of the invention to provide a method by which said film reel effect is avoided or at least reduced.

For achieving the object a belt retractor for a seat bell is provided comprising a belt reel onto which webbing can be wound while being spring-loaded and comprising a tensioning device adapted to act on the belt reel in a winding direction. In accordance with the invention, a control adapted to activate the tensioning device when the seat belt is unloaded and unfastened is provided.

The invention is based on the consideration to wind the webbing already before the fastening of the seat belt by a vehicle occupant so tightly onto the belt reel that a film reel effect is prevented or at least reduced. This is achieved by an additional control by which in an unloaded and hence unfastened state of the seat belt the tensioning device is controlled so that a definitely higher winding force acts on the belt reel than by the winding mechanism of the belt retractor. In the unloaded state the belt is tensioned between end fittings and the belt retractor, in the case of a three-point seat belt additionally about a deviating point. As the webbing is completely tensioned, higher winding force has a direct influence on the windings of the webbing on the belt reel which are thus tightened more closely on the belt reel. The webbing is thus wound more tightly onto the belt reel before the seat belt is fastened so that, when the seat belt is fastened, the windings remaining on the belt reel are even more tightened.

The prior art tensioning systems usually activate the tensioning device as late as in a case of restraint, for example after the locking of the seat belt and, resp., the belt reel or in the case of a pre-tensioning system immediately before the locking of the seat belt. In any case the tensioning is effectuated only when the belt is fastened. Thus, in the case of restraint the belt tensioner has to work against the film reel effect before the seat belt can be further tensioned. Since the webbing in the belt retractor according to the invention is wound more tightly already before the locking of the belt reel in a case of restraint a vehicle occupant can participate more quickly in the overall deceleration of the vehicle. Since the tensioning is carried out in an unfastened state of the seat belt, the vehicle occupant is not affected so that it is possible to apply very high tensioning forces so as to achieve tighter wind-up of the webbing.

Preferably tensioning takes place only when no vehicle occupant is present in the vehicle so that any distraction or confusion of the vehicle occupant is prevented. In order to ensure this the control includes at least one sensor for measuring defined conditions of the vehicle and releasing the tensioning in response to said vehicle conditions.

For example, the sensor may be an inclinometer, wherein the control releases the tensioning only when the vehicle is parked in a substantially horizontal position. Belt retractors usually include a vehicle-sensitive locking function adapted to lock the belt reel, when the vehicle is inclined. For releasing such locking it is necessary to relieve the webbing and, resp., to rotate the belt reel in the winding direction. If, in the case of an inclined vehicle, tensioning is activated, there is the risk of the belt reel with a strongly tensioned seat belt being blocked so that it is not possible to release the locking by rotating the belt reel or relieving the webbing.

The sensor may also be a passenger compartment monitoring system, for example, which ensures that no vehicle occupant is present in the vehicle or a look-up monitoring system, for example, which ensures that the vehicle is parked and the doors are locked, hence the vehicle is in a parked position and is locked. Alternatively, the sensor may also be a pull-out sensor, as it is called, ensuring that the belt is completely unfastened and wound up. Such sensor may be useful to guarantee that even when the vehicle is parked no vehicle occupant stays in the vehicle or that the seat belt is not used to fix objects in the parked vehicle and hence tensioning takes place only when the seat belt is unloaded.

In accordance with the invention, moreover a method of tensioning a non-used seat belt by acting on a belt reel in a winding direction is provided, wherein a control detects that the seat belt is unloaded and is not fastened by a vehicle occupant and subsequently the belt reel is loaded in the winding direction.

In said method the control checks, for example, whether the vehicle is parked and locked up and ensures that the tensioning is activated only when the vehicle is in a parked and locked-up condition. This embodiment of the method is based on the fact that in the case of a parked and locked-up vehicle no occupant stays in the vehicle so that it is guaranteed that the tensioning has no impact on, does not confuse or distract the vehicle occupant. In addition, it is ensured that tensioning does not occur when a vehicle occupant intends to get buckled and hence extends the seat belt.

The tensioning can be activated, for example, delayed in time vis-à-vis the detection of the parked and locked-up condition of the vehicle. After the vehicle has been parking and locked up, tensioning is thus delayed by a defined period of time so as to ensure that no person is present in the vehicle.

The control is also adapted to check whether a vehicle occupant is present in the vehicle. This check is performed, for instance, by a passenger compartment monitoring system or a motion sensor, wherein e.g. sensors of a vehicle alarm system can be used for this purpose. Equally, the tensioning is activated only when no vehicle occupant is detected in the vehicle. The use of the passenger compartment monitoring system offers the advantage that persons may be waiting in the parked and locked vehicle without the seat belts being tensioned.

Preferably also the position of the vehicle is detected and tensioning is activated only when the vehicle is parked in a horizontal position so as to prevent the belt reel and, resp., the wound-up seat belt from being additionally locked by a vehicle-sensitive locking device.

The control may additionally detect the position of the seat belt and activate tensioning only when the seat belt is unfastened and wound up. Such detection of the seat belt position can be effectuated by a pull-out sensor, for example. This ensures that there is no buckled person in the vehicle when the latter is in the parked condition or that the belt is not used for fixing objects. In both cases tensioning is not desired. When the seat belt is fastened, tensioning could be very uncomfortable for the buckled person. A fixed object might be damaged by such tensioning.

In order to prevent the vehicle battery from being discharged by repeated tensioning operations, the control is adapted to additionally check the charge condition of the battery. The tensioning is activated only above a defined charge condition of the battery.

So as not to unnecessarily load the tensioning device and, resp., the vehicle battery the control may also be provided for counting the winding and unwinding operations of the seat belt and the tensioning may only be activated after a defined number of winding and unwinding operations. For example, this is effectuated by a count mechanism disposed at the pull-out sensor or at the belt buckle. The number of winding and unwinding operations depends on the webbing stiffness, the strength of the retractor spring or the friction at the webbing deviation points, for instance.

BRIEF DESCRIPTION OF THE DRAWINGS

Further advantages and features will be evident from the following description in connection with the enclosed drawings in which.

DESCRIPTION

Figure 1:
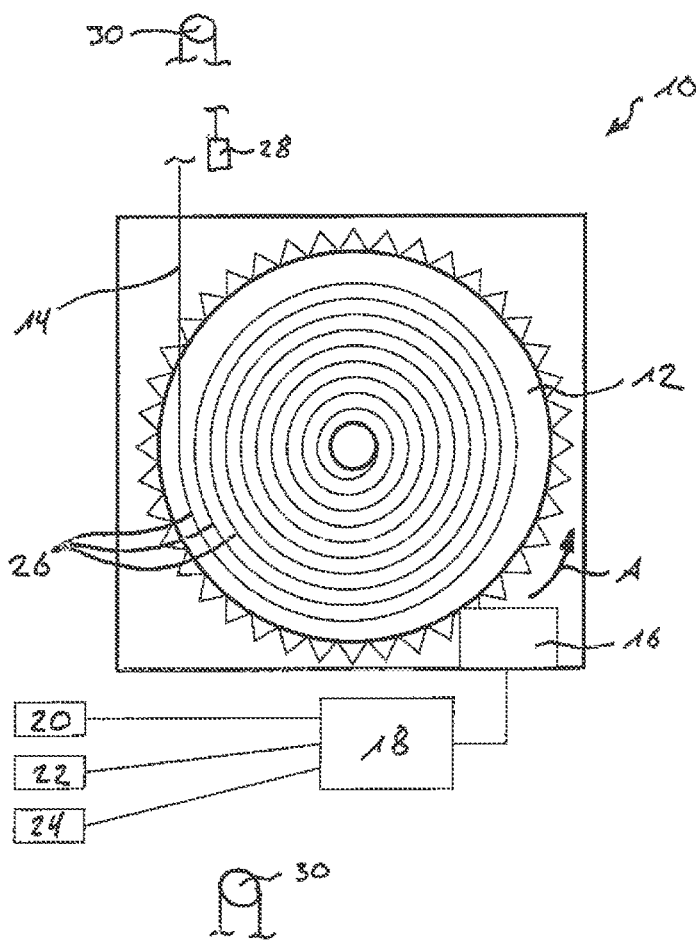
FIG. 1 shows a schematic of a belt retractor according to the invention before the tensioning device is activated.

FIG. 1 illustrates a belt retractor 10 comprising a belt reel 12 which is rotatably supported in the belt retractor 10 and onto which webbing 14 can be wound. A winding mechanism known per se and not shown here in detail acts on the belt reel 12 and applies a spring force directed in the winding direction A to the belt reel 12 so that the webbing 14 is wound onto the belt reel 12 while being spring-loaded.

The belt retractor 10 further includes a tensioning device 16 comprising a motor adapted to act on the belt reel 12 additionally in the winding direction A, a control 18 for activating the tensioning device 16 and a locking device not shown here.

Figure 2:
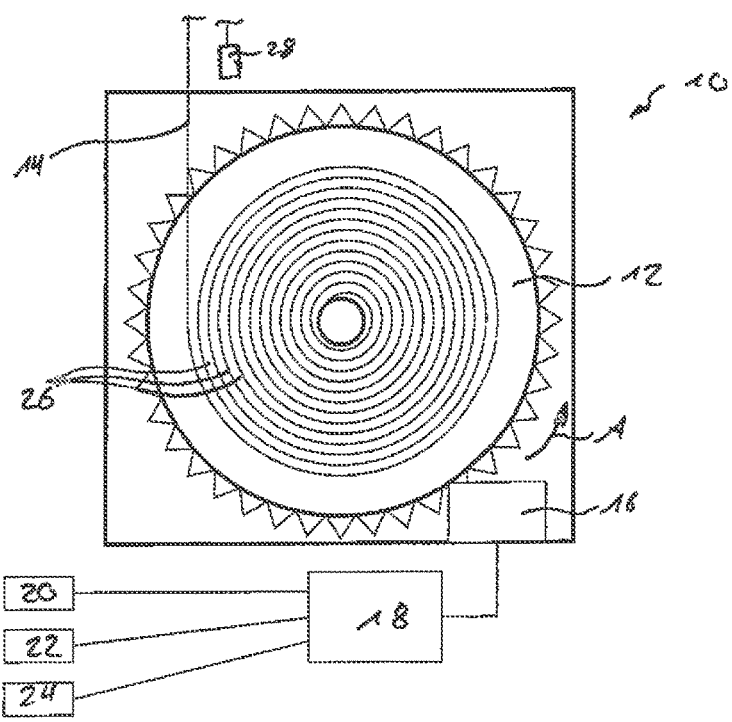
FIG. 2 shows a schematic of a belt retractor according to the invention after activation of the tensioning device.

As is evident from FIGS. 1 and 2, furthermore sensors adapted to measure different conditions of the vehicle are provided. The sensors are coupled to the control 18 and can transmit the measured vehicle conditions to the control 18.

A first sensor provided on the belt retractor is an inclinometer 20 measuring the inclination of the vehicle relative to the horizontal. Said sensor usually controls a vehicle-sensitive locking of the belt reel 12. For this purpose the inclinometer 20 is additionally coupled to the locking device.

A second sensor is a webbing extension sensor 22 for detecting the position of the webbing 14 and, resp., how far the webbing is extended.

Additionally, a passenger compartment sensor 24 is provided for detecting the movements in the passenger compartment.

In conventional belt retractors 10 the tensioning device 16 serves for tensioning the webbing 14 in the restraining case of the belt retractor 10 by reducing a belt slack and pulling the vehicle occupant into the seat. For this, the belt reel 12 is loaded in the winding direction A so that webbing 14 which is not required is wound onto the belt reel 12. Thus the webbing 14 of the seat belt is in tight contact with the vehicle occupant and the latter can be involved more quickly in the overall deceleration of the vehicle.

The seat belt is usually wound comparatively loosely on the belt reel 12 by the repeated winding and unwinding operations. This has the effect that the windings 26 of the webbing 14 are tightened on the belt reel 12 upon locking of the belt reel 12 and a forward movement of the vehicle occupant, thereby additional webbing extension taking place although the belt reel 12 is locked. In general, this effect is referred to as film reel effect.

A belt slack can be eliminated by the tensioning device 16 and in the case of tensioning a defined length of the webbing 14 can be drawn in even after the belt reel 12 has been locked.

However, according to the invention it is provided that the control 18 activates the tensioning device 16 when the seat belt is not fastened so that upon activation of the locking device the webbing 14 is wound more tightly onto the belt reel 12.

As is evident from FIG. 1, in the unloaded state the webbing 14 is tensioned between a fitting 28 fixed to the vehicle and the belt retractor 10, with deflection via deflection fittings 30 being possible. Hence the webbing 14 is completely stretched so that loading the belt reel 12 in the winding direction A results in the windings 28 of the webbing 14 being tightened on the belt reel 12, as is evident from FIG. 2.

This results in the fact that the film reel effect is prevented or at least reduced during or after locking of the belt retractor 10. Exactly speaking, the belt reel 12 is loaded in the unloaded state of the seat belt so that said effect occurs, other than in prior art, already before fastening the seat belt and hence the webbing 14 is wound most tightly onto the belt reel 12 already before the seat belt is fastened.

As the tensioning device 16 may cause very high tensioning forces to act on the belt reel 12 and thus on the webbing 14, however, this operation has to take place when the seat belt is not fastened and not in use so that the vehicle occupant is not confused, distracted or impaired by the sudden tensioning of the webbing 14.

The passenger compartment sensor 24 detects, for example, whether a person is present in the passenger compartment. The tensioning device 16 is activated by the control 18 exclusively when no person is present in the passenger compartment.

It can be detected by additional sensors, for instance, that the vehicle is parked and locked up. In this case it is assumed that no person is present inside the locked and parked vehicle. For detecting this state, additional sensors of tie locking system or a parking brake may be coupled to the control 18, for example.

In addition, it can be detected by the webbing extension sensor 22 whether the webbing 14 is completely wound on the belt reel 12, hence there is no waiting person buckled or the seat belt is not fastened around an object inside the parked vehicle.

The inclinometer 20 additionally ensures that the vehicle is parked in a horizontal position. Regular belt retractors include a locking function which locks the belt reel 12 and thus the seat belt when the vehicle is inclined. Such locking can be released only by slackening the webbing 14 or by rotating the belt reel 12 in the winding direction A. If the tensioning device 16 is activated when the vehicle is not parked horizontally, there is a risk that the webbing 14 will be additionally tensioned and the vehicle-sensitive lock function will be triggered. As the webbing 14 is completely wound up and additionally tensioned in thus state, relief of the webbing 14 required to release the locking is not possible. For this reason, the tensioning device 16 is activated only when a response of the vehicle-sensitive locking is excluded, i.e. when the vehicle is horizontally positioned.

Alternatively, it is also possible that, after detecting that the vehicle has been parked and the doors have been locked, tensioning is not activated before a defined period of time has lapsed so as to make sure that no person is present inside the vehicle. Moreover, in this way any confusion of the persons possibly still standing next to the vehicle by the noise in the vehicle will be avoided.

Furthermore, the webbing extension sensor 22 can measure the number of unwinding operations and winding operations of the webbing 14 or can detect how far the webbing 14 is extended.

Tensioning is not necessary after each unwinding operation of the webbing 14, to be sure, as only the windings 26 which have been unwound before are loosely wound up. Thus the effect of the tighter winding is maintained longer for the windings 26 which are not unwound.

Thus it is only after a defined number of unwinding operations that a repeated tensioning of the windings 26 may occur, i.e. when it has to be assumed that the entire webbing 14 has slackened again on the belt reel 12. This offers the advantage that the tensioning device 16 as well as the entire mechanism of the belt retractor 10 is preserved. Moreover, also the battery of the vehicle supplying the energy required for tensioning is spared.

Optionally, the control 18 can also check the charge condition of the vehicle battery so as to prevent the vehicle battery from being discharged by the tensioning device 16.

If any hazard to vehicle occupants or objects in the vehicle is excluded and it is thus detected by the sensors that the seat belt is unloaded and not in use, tensioning can be carried out by the tensioning device 16 by applying very high force so that the webbing 14 is wound as tightly as possible on the belt reel 12.

Tensioning is performed, for example, by a force of 100 N, whereas during regular operation of the winding mechanism usually merely a winding force of about 10 N is attained.

For this purpose, a slowly increasing tensioning force can be applied, for example. In this way the mechanism of the tensioning device 16 is preserved and high noise emission is prevented which might occur e.g. by sudden tensioning of the webbing 14 and might confuse persons inside and outside of the vehicle. For instance, the tensioning device 16 may be controlled via the current intensity so that the tensioning force can be gradually increased.

The invention claimed is:

1. A method of tensioning a non-used vehicle seat belt by acting on a belt reel (12) in the winding direction,
    wherein a control (18) detects that the seat belt is unfastened and that subsequently the belt reel (12) is rotated in the winding direction,
    and wherein the control (18) determines whether the vehicle has been parked and locked up, the control being configured so that it activates the tensioning so as to rotate the belt reel in the winding direction only when the vehicle is parked and locked up.

2. The method according to claim 1, wherein the tensioning is activated delayed in time vis-à-vis the determination of whether the vehicle has been parked and locked up.

3. The method according to claim 1, wherein the control (18) checks whether a vehicle occupant is present in the vehicle, by passenger compartment monitoring or a motion sensor, and the tensioning is activated only when no person is present in the vehicle.

4. The method according to claim 1, wherein a sensor determines a position of the vehicle and the belt reel is rotated in the winding direction only when the position of the vehicle is one wherein a vehicle-sensitive belt reel locking device is inactive.

5. The method according to claim 1, wherein the control (18) detects a position of a seat belt webbing (14) and the belt reel is rotated in the winding direction only when the seat belt is unfastened and wound onto the belt reel.

6. The method according to claim 5, wherein the control detects the position of the webbing by means of a pull-out sensor.

7. The method according to claim 1, wherein the control (18) checks a charge condition of a vehicle battery and the belt reel is rotated in the winding direction only above a defined charge condition of the vehicle battery.

8. The method according to claim 1, wherein the control (18) counts a number of times the belt is wound and unwound from the belt reel and the belt reel is rotated in the winding direction only after the belt has been wound and unwound from the belt reel a defined number of times.

9. A method of tensioning an unused vehicle seat belt, comprising:
    detecting if the seat belt is unfastened;
    determining if the vehicle is parked and locked up; and
    rotating a belt reel in a winding direction by a motor configured to tension the seat belt only when it is determined that the vehicle is parked and locked and the seat belt is unfastened.

10. The method of claim 9, wherein rotating the belt reel in the winding direction is delayed for a specified amount of time after it is determined that the vehicle is parked and locked.

11. The method of claim 9 further comprising determining if an occupant is present in the vehicle and rotating the belt reel in the winding direction when it is determined that no occupant is present in the vehicle.

12. The method of claim 9 further comprising sensing the position of the vehicle and rotating the belt reel in the winding direction only when the position of the vehicle is one wherein a vehicle-sensitive belt reel locking device is inactive.

13. The method of claim 9 further comprising detecting a position of a seat belt webbing and rotating the belt reel in the winding direction only when it is detected that the seat belt is unfastened and wound onto the belt reel.

14. The method according to claim 9 further comprising determining a charge condition of a battery of the vehicle and rotating the belt reel in the winding direction only when it is determined that the battery is above a defined charge condition.

15. The method according to claim 9 further comprising counting a number of times the belt is wound and unwound from the belt reel and rotating the belt reel in the winding direction only after the belt has been wound and unwound from the belt reel a defined number of times.

\* \* \* \* \*